United States Patent [19]
Ishiguro

[11] 3,711,644
[45] Jan. 16, 1973

[54] AUTOMATIC DIAPHRAGM CONTROL APPARATUS FOR IMAGE TUBE

[75] Inventor: Yasuo Ishiguro, Tokyo, Japan

[73] Assignee: Kabushiki Kaisha Koparu, Tokyo-To, Japan

[22] Filed: Sept. 17, 1971

[21] Appl. No.: 181,447

[30] Foreign Application Priority Data

Sept. 18, 1970 Japan....................45/92828

[52] U.S. Cl............................178/7.92, 178/DIG. 29
[51] Int. Cl................................................H04n 5/26
[58] Field of Search......................178/7.92, DIG. 29

[56] References Cited

UNITED STATES PATENTS 3,496,289   2/1970   Tanner................................178/7.92

Primary Examiner—Robert L. Griffin
Assistant Examiner—George G. Stellar
Attorney—Cushman, Darby & Cushman

[57] ABSTRACT

An automatic diaphragm control apparatus for image tube comprising a diaphragm means for controlling the amount of light incident to the light-receiving plane of an image tube, a photoconductive cell for receiving a part of the light having passed through the diaphragm means, a Wheatstone bridge circuit including the photoconductive cell in one of the branches thereof, a servo-motor adapted to be driven by the unbalanced voltage occurring in the bridge circuit and assigned for operating the diaphragm means, and a switch means interlocked with the power switches and adapted to act to momentarily elevate - prior to the opening of the power switches - the potential of one of the two output terminals of the bridge circuit to a level exceeding that of the potential of the other of the output terminals, the apparatus being operative so that, whenever the power switches are opened, the diaphragm means is always held at its minimum diaphragm aperture position, preventing the light-receiving plane of the image tube from sustaining any damage from burning caused by the intensive ambient light incident towards this light-receiving plane.

3 Claims, 4 Drawing Figures

PATENTED JAN 16 1973 3,711,644

AUTOMATIC DIAPHRAGM CONTROL APPARATUS FOR IMAGE TUBE

BACKGROUND OF THE INVENTION

1. Field of the invention

The present invention is concerned with an automatic diaphragm control apparatus for image tube, and more particularly, it relates to an apparatus of the type described which is intended for protecting the light-receiving plane of the image tube from being exposed to intensive light rays.

2. Description of the prior art

In general, an image tube receives light on its light-receiving plane which is coated with a light-sensitive material. Such a coated light-receiving plane tends to very easily lose much of its assigned function as it is exposed to light of an intensive brightness. Therefore, in the case of an image tube designed to have a high sensitivity to light in particular, it is desirable that care be taken so that its light-receiving plane is not exposed to any incident light having a value of brightness in excess of a certain level. In the known automatic diaphragm control apparatus designed for the foregoing purpose, however, it occurs — whenever the supply of power to the servo-motor intended for controlling the diaphragm means is suspended during the use of the apparatus — that the diaphragm blades are held exactly at a diaphragm aperture position which is determined at the time of suspension of the power supply. Hence, there arises the inconvenience that, should a light which is more intensive in brightness than that which has been incident thereto before this suspension impinge onto the light-receiving plane of the image tube, the light-receiving plane becomes damaged.

In actual operation of the known apparatus of the aforesaid type, as will be understood by referring to FIG. 1, the light rays which have passed through the objective lens 1 will then pass through the diaphragm means 2. Therefrom, a part of the light rays will impinge onto the light-receiving plane 4a of the image tube 4 by the action of a half mirror 3. However, the remainder of the light rays will be allowed to impinge onto a photoconductive cell $Rx$ so that the light rays will be utilized to automatically control the diaphragm means 2. More specifically, those light rays which are incident to the photoconductive cell $Rx$ are amplified by a servo-amplifier 5, and a servo-motor M which is connected to the output terminal of said servo-amplifier 5 is actuated to drive the diaphragm means 2 so as to always maintain the amount of the light reaching, therethrough, the light-receiving plane 4a of the image tube 4 at a constant level of value.

Still more specifically, the known apparatus contains a circuitry arranged, as shown in FIG. 2, in such a manner that an amplifier 6 composed of transistors $Tr_1 - Tr_6$ which are connected in the manner as shown in FIG. 2 is connected to the output terminals of a bridge circuit which, in turn, is composed of resistors $R_1$, $R_2$, $R_3$ and the photoconductive cell $Rx$, and also that the servo-motor M is connected to the output terminal of said amplifier 6. The diaphragm means 2 of this known apparatus is driven by this servo-motor M to always keep the bridge circuit in its balanced state. Therefore, according to the action of this servo-motor, it will arise, whenever a light having a value of brightness exceeding the predetermined level impinges onto the photoconductive cell $Rx$, that the resistance value of this cell $Rx$ will become decreased, with the result that the potential at point B in FIG. 2 becomes higher in level than that of point A in FIG. 2. As a consequence, the transistors $Tr_2$, $Tr_4$ and $Tr_6$ will be rendered conductive and, accordingly, a current flowing in the direction of the arrow F, i.e., from point D towards point C will be supplied to the servo-motor M to thereby drive the diaphragm means 2 so as to reduce its light-passing area. Conversely, when a light having a value of brightness smaller than the predetermined reference value impinges onto the photoconductive cell $Rx$, then the resistance value of this cell $Rx$ will increase so that the potential at point B becomes lower than that of point A. As a result, the transistors $Tr_1$, $Tr_3$ and $Tr_5$ are rendered conductive so that a current flowing in the direction of the arrow G, i.e., from point C toward point D, will be supplied to the servo-motor M to drive the diaphragm means 2 in such a way as to increase its light-passing area. After all, the diaphragm menas 2 is automatically controlled so that the light rays incident to the photoconductive cell $Rx$, or in other words the light rays incident to the image tube 4, is adapted to be regulated so that they will always have a value of brightness equal to the aforesaid reference value.

Accordingly, the conventional servo-means shown in FIG. 2 functions so that, when the power switches $SW_1$ and $SW_2$ are opened, the diaphragm means 2 will be held at a diaphragm aperture position corresponding to the intensity of light to which the photoconductive cell $Rx$ has been exposed up to the time immediately prior to the opening of these power switches $Sw_1$ and $SW_2$. As a result, in case the intensity of light at the time of opening of the power switches $SW_1$ and $Sw_2$ is relatively small and in case, accordingly, the diaphragm means 2 is held open to a certain extent, there will arise the trouble — if a very bright light, such as the light from an electric bulb or from the sun, impinges at such a time onto the light-receiving plane 4a of the image tube 4 through the aperture of the diaphragm means 2, which is already open to a certain extent — that the light-receiving plane 4a of the image tube 4 will become damaged from burning.

SUMMARY OF THE INVENTION

It is, therefore, an object of the present invention to provide an automatic diaphragm control apparatus for image tube, which has means adapted to be interlocked with the power switches immediately before these switches are opened to momentarily elevate the potential of one of the two output terminals of a bridge circuit containing a photoconductive cell in one of the branches thereof to a level higher than the potential level of the other one of these output terminals, to thereby always drive the diaphragm means to proceed towards its minimum diaphragm aperture position prior to the opening of the power switches, whereby preventing any intensive light from impinging onto the light-receiving plane of the image tube.

Another object of the present invention is to provide an automatic diaphragm control apparatus wherein the means adapted to be interlocked with power switches immediately before these power switches are opened to momentarily elevate the potential of one of the two output terminals of a bridge circuit containing a photoconductive cell in one of its branches thereof to a level higher than the potential level of the other one of the two output terminals is formed with a switch assigned for opening and closing said one of the branches of the aforesaid bridge circuit, to thereby simplify the structure of the apparatus as a whole.

DESCRIPTION OF THE PREFERRED EMBODIMENTS

Figure 3:
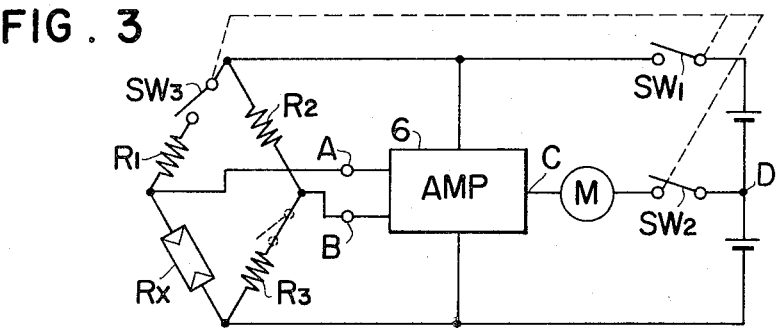
FIG. 3 is a circuit diagram, showing the automatic control circuit according to the present invention and corresponding to the circuit shown in FIG. 2.
Figure 4:
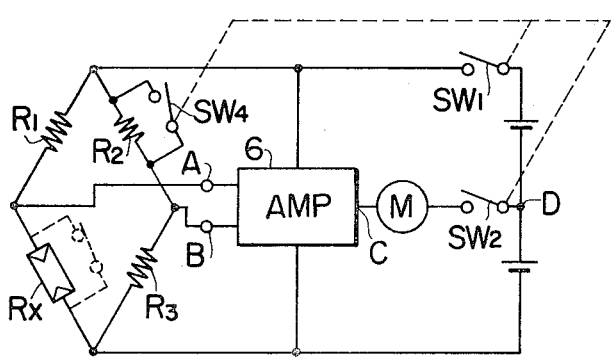
FIG. 4 is a circuit diagram, showing another example of the automatic control circuit of the present invention and corresponding to the circuit shown in FIG. 2.

The apparatus of the present invention will hereunder be described by referring to the accompanying drawings. FIGS. 3 and 4 show examples of the apparatus which are different from each other but embodying the present invention.

Figure 1:
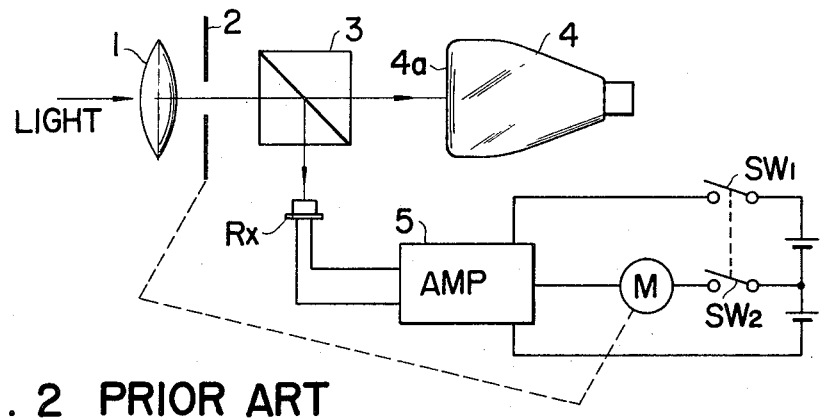
FIG. 1 is a somewhat diagrammatic illustration, showing the basic structure of the known automatic diaphragm control apparatus for image tube.
Figure 2:
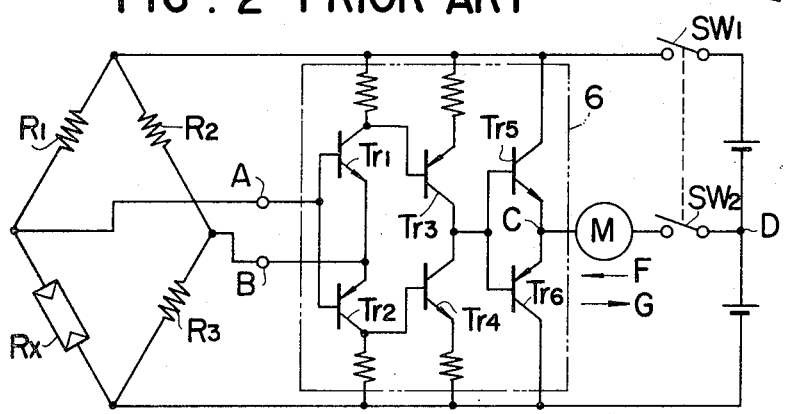
FIG. 2 is a circuit diagram, showing the known automatic control circuit which is applied to the diaphragm control apparatus shown in FIG. 1.

It should be understood that like parts which function in the same way as those of the apparatus and circuit of the prior art shown in FIGS. 1 and 2 are indicated by like reference numerals and symbols. It should be understood also that the circuits shown in FIGS. 3 and 4 behave in the same manner as that shown in FIG. 2 excepting those behaviors done by the additionally provided auxiliary switch $SW_3$ (FIG. 3) and the auxiliary switch $SW_4$ (FIG. 4), respectively. More specifically, in FIG. 3, the circuit behaves in the same way as is explained in connection with FIG. 2 when the auxiliary switch $SW_3$ is closed. Whereas, the circuit shown in FIG. 4 behaves in the same way as is explained with respect to FIG. 2 when he auxiliary switch $SW_4$ is opened.

With respect first to the example shown in FIG. 3, arrangement is provided to be operative so that, when the power switches $SW_1$ and $SW_2$ are to be opened, the auxiliary switch $SW_3$ is opened in association with the actions of the power switches by the use of, for example, a known slide switch means, prior to the actual opening actions of the power switches. Whereupon, the potential level at point B will be considerably quickly elevated to a level higher than the potential level of point A. Accordingly, as stated previously, a current flowing in the direction of the arrow F will be supplied to the servo-motor M so that the diaphragm means 2 will be driven to proceed towards its minimum diaphragm aperture position, i.e., either a pinhole position or the completely closed position. Since the diaphragm means 2 will continue its state of being held at the minimum diaphragm position, it will be understood that as the power switches $SW_1$ and $SW_2$ are subsequently opened, the light-receiving plane 4a of the image tube 4 is not exposed to such an incident light as would otherwise injure this light-receiving plane, however much intensive the condition of the ambient light may be.

In the example shown in FIG. 4, on the other hand, there is provided an arrangement to be operative so that, when the power switches $SW_1$ and $SW_2$ are to be opened, the auxiliary switch $SW_4$ is closed by the use of, for example, a known rotary switch means, prior to the actual opening actions of these power switches $SW_1$ and $SW_2$. In this latter instance also, the potential level at point B will be considerably quickly elevated to a level higher than the potential level of point A. Accordingly, the diaphragm means 2 is driven by the servo-motor M to proceed towards its minimum diaphragm aperture position as stated previously, so that no light so strong as would otherwise injure the light-receiving plane 4a of the image tube 4 will be allowed to impinge onto this light-receiving plane 4a.

It should be understood that the auxiliary switch $SW_3$ may be provided on the branch containing a resistor $R_3$ as shown by dotted lines in FIG. 3, and the auxiliary switch $SW_4$ may be provided on the branch containing a photoconductive cell $Rx$ as shown by dotted lines in FIG. 4, without any loss or change in function or effect of the present invention in each of these modified instances.

I claim:

1. An automatic diaphragm control apparatus for image tube comprising in combination an image tube, a half mirror provided in the foreground of a light-receiving plane of said image tube in adjacent relationship therewith, a diaphragm means positioned in the foreground of said half mirror in adjacent relationship with said half mirror, a photoconductive cell positioned adjacent to said half mirror and adapted to receive a part of the light having passed through said diaphragm means, a Wheatstone bridge circuit containing said photoconductive cell in one of its branches, an amplifier connected between the output terminals of said bridge circuit, a servo-motor connected to the output terminal of said amplifier, and power switches connected to the input terminals of said bridge circuit, respectively, wherein said automatic diaphragm control apparatus further comprises means arranged to act in interlocking relationship with said power switches and to be operative to momentarily elevate the potential level of one of the output terminals of said bridge circuit to a level higher than the potential level of the other one of these output terminals immediately before said power switches are opened, whereby said diaphragm means is held at its minimum diaphragm aperture position whenever said power switches are opened.

2. An automatic diaphragm control apparatus according to claim 1, in which said means arranged to act in interlocking relationship with said power switches and to be operative to momentarily elevate the potential level of one of the output terminals of said bridge circuit to a level higher than that of the other one of these output terminals immediately before the opening of said power switches is a switch inserted in one of those two branches of said bridge circuit which are connected to the photoconductive cell and adapted to be opened prior to the opening of said power switches when these power switches are to be opened.

3. An automatic diaphragm control apparatus according to claim 1, in which said means arranged to act in interlocking relationship with said power switches and to be operative to momentarily elevate the potential level of one of the output terminals of said bridge circuit to a level higher than that of these output terminals immediately before the opening of said power switches is a switch connected in parallel with one of the resistors contained in those branches of said bridge circuit which face either said photoconductive cell or the branch containing this photoconductive cell and adapted to be closed before said power switches are opened.

* * * * *